(12) United States Patent
Rice

(10) Patent No.: US 10,539,286 B1
(45) Date of Patent: Jan. 21, 2020

(54) BAFFLED TRI-REGION OPTIC FOR AN AFS VEHICLE HEADLAMP

(71) Applicant: OSRAM SYLVANIA Inc., Wilmington, MA (US)

(72) Inventor: Lawrence Rice, Hillsboro, NH (US)

(73) Assignee: OSRAM SYLVANIA Inc., Wilmington, MA (US)

( * ) Notice: Subject to any disclaimer, the term of this patent is extended or adjusted under 35 U.S.C. 154(b) by 16 days.

(21) Appl. No.: 16/022,046

(22) Filed: Jun. 28, 2018

(51) Int. Cl.
*F21S 41/265* (2018.01)
*F21S 41/43* (2018.01)
*G02B 3/04* (2006.01)
*F21S 41/143* (2018.01)
*B60Q 1/08* (2006.01)
*F21Y 115/10* (2016.01)
*F21Y 105/10* (2016.01)

(52) U.S. Cl.
CPC ............ *F21S 41/265* (2018.01); *B60Q 1/085* (2013.01); *F21S 41/143* (2018.01); *F21S 41/43* (2018.01); *G02B 3/04* (2013.01); *B60Q 2300/42* (2013.01); *F21Y 2105/10* (2016.08); *F21Y 2115/10* (2016.08)

(58) Field of Classification Search
CPC .......... F21S 41/265; F21S 41/40; F21S 41/43; B60Q 1/085; B60Q 2300/42
See application file for complete search history.

(56) References Cited

U.S. PATENT DOCUMENTS

| 7,178,960 B2 | 2/2007 | Ishida | |
|---|---|---|---|
| D721,201 S | 1/2015 | Egly et al. | |
| D721,454 S | 1/2015 | King et al. | |
| 9,759,400 B2 | 9/2017 | Rice et al. | |
| 2006/0262552 A1* | 11/2006 | Komatsu | B60Q 1/0052 362/539 |
| 2008/0013333 A1* | 1/2008 | Koizumi | B60Q 1/2696 362/511 |

(Continued)

OTHER PUBLICATIONS

Press release for Eviyos hybrid LED chip from Osram Opto Semiconductors (Regensburg, DE) dated Sep. 25, 2017, viewed on website www.osram.com/os/press/press-releases onJun. 12, 2018 (2 pgs).

(Continued)

*Primary Examiner* — Anh T Mai
*Assistant Examiner* — Michael Chiang
(74) *Attorney, Agent, or Firm* — Edward S. Podszus

(57) ABSTRACT

An automotive lighting system (41) includes an automotive lamp having an LED array (14) and a lens (34). The lens (34) images a square field of illumination (101) into rectangular field of illumination (48) to support adaptive front lighting in an automotive environment (28). The lens (34) includes light-transmissive first, second, and third regions (64, 66, 68), and a baffle (70) adapted to obstruct light from spreading between the light-transmissive first, second, and third regions (64, 66, 68). The baffle (70) is disposed between the LED array (14) and light receiving surfaces (98, 104, 110) of the light-transmissive first, second, and third regions (64, 66, 68). The lens (34) enables imaging of an approximately rectangular field of illumination (48) from a single chip (12), reducing cost and cooling needs of adaptive front lighting systems.

24 Claims, 9 Drawing Sheets

(56) References Cited

U.S. PATENT DOCUMENTS

| | | | |
|---|---|---|---|
| 2013/0010488 A1* | 1/2013 | Koizumi | F21S 41/147 |
| | | | 362/517 |
| 2013/0107560 A1 | 5/2013 | Kim et al. | |
| 2016/0230948 A1* | 8/2016 | Kratochvil | F21S 41/147 |
| 2017/0276309 A1* | 9/2017 | Nakazawa | F21S 41/143 |
| 2017/0276310 A1* | 9/2017 | Nakazawa | B60Q 1/0035 |
| 2019/0178462 A1* | 6/2019 | Kizaki | F21S 41/148 |

OTHER PUBLICATIONS

Technical data sheet for Eviyos LED chip with IC, published by Osram Opto Semiconductors, viewed on website www.osram.com/os/applications on Jun. 13, 2018 (3 pgs).

\* cited by examiner

BAFFLED TRI-REGION OPTIC FOR AN AFS VEHICLE HEADLAMP

STATEMENT REGARDING FEDERALLY SPONSORED RESEARCH OR DEVELOPMENT

N/A

TECHNICAL FIELD

The present application relates to automotive headlamps and more particularly to a baffled tri-region optic of a headlamp for illumination by a plurality of light emitting diodes (LEDs).

BACKGROUND

Lighting systems may use one or more optical lenses to direct light from a light source in a particular direction. Such lighting systems are used in a variety of light applications including, but not limited to, headlamps for use in vehicles. Many lighting systems are subject to regulations which govern, inter alia, installation requirements, test procedures, design guidelines, and performance requirements. Such regulations for headlamps include, but are not limited to regulations described in Department of Transportation (DOT) 49 C.F.R. § 571.108 (Transportation).

Some automotive lighting systems provide smart lighting technologies that use adaptive front lighting systems (AFS) to selectively dim regions of the lamp's field of illumination. However, a known AFS system relies on complex solutions of optics having, in each of the two headlamp modules that together make up one headlight, three separate glass lenses, of differing indices of refraction, which are stacked axially in carefully spaced relation to one another in front of two side-by-side chips each of the type marketed under the name Eviyos (1024 LEDs/chip) by Osram Opto, thus totaling 6 glass lenses and 4 Eviyos chips per headlight. To achieve correct focus, the three glass lenses are manufactured from high-quality material and are therefore expensive. As a result, despite the safety benefits of these smart/adaptive front lighting systems, this technology is primarily limited to expensive models of vehicles.

Vehicle lamp lens cover designs with integrated grilles are known in U.S. Design Pat. D721,201 (Egly & King) and D721,454 (King & Egly) (hereinafter the "Egly lens covers"). The Egly lens covers have grille portions extending over portions of their exterior to evoke the aesthetic look resulting from the combination of previously known separate protective grille covers sold as aftermarket items that are attached exteriorly over a vehicle lamp to protect the lamp from impact. The Egly grille portions do not extend between the light receiving surface of the lens and the exterior, light emission side to physically separate the lens into separate and distinct optical components. Due to the placement and small and/or slender size of the Egly grille portions, a person of ordinary skill in the headlamp art understands that these grille portions cannot substantially obstruct light exiting from any regions of the lens. Furthermore, a person of ordinary skill understands that the vehicle lamps with the Egly grille portions do not include an imaging lens.

BRIEF DESCRIPTION OF THE DRAWINGS

Reference should be made to the following detailed description which should be read in conjunction with the following figures, wherein like numerals represent like parts.

DETAILED DESCRIPTION

In general, one embodiment of the present disclosure features a baffled tri-region lens for an automotive lighting system, more particularly for an adaptive front lighting system automotive headlamp. The lens is configured to image a light emitting diode (LED) pattern onto an approximately rectangular field of illumination. The lens is configured to transform or focus an unfocused field of illumination of an array of LEDs into the approximately rectangular field of illumination. The lens is configured to image or project the approximately rectangular field of illumination from a single die or chip carrying the array of LEDs, according to an embodiment.

An automotive lighting system consistent with at least one embodiment of the present disclosure allows for an economical implementation of an adaptive lighting system. An adaptive lighting system may sense oncoming and ongoing vehicles within a field of illumination and may selectively dim or de-illuminate portions of the field of illumination based on the sensed vehicles. Embodiments of the disclosed lens enables an approximately rectangular field of illumination to be imaged from a single light source (e.g., a single array of LEDs). Because each light source generates heat and is associated with a cost, the disclosed lens decreases heat dissipation requirements and reduces overall automotive lamp costs by enabling use of a single light source (whereas existing adaptive lighting systems require multiple LED chips).

Another advantage of the disclosed lens is that it may be inexpensively manufactured. The lens may include portions of aspherical lenses which may be formed by extrusion of a transparent plastic (such as, but not limited to, poly(methyl methacrylate) (PMMA)). In addition, the automotive lamp that incorporates the disclosed lens may be operated using only one die carrying an array of LEDs, thereby reducing the manufacturing costs, which may allow the technology to be extended to non-high-end vehicle models.

Figure 1:
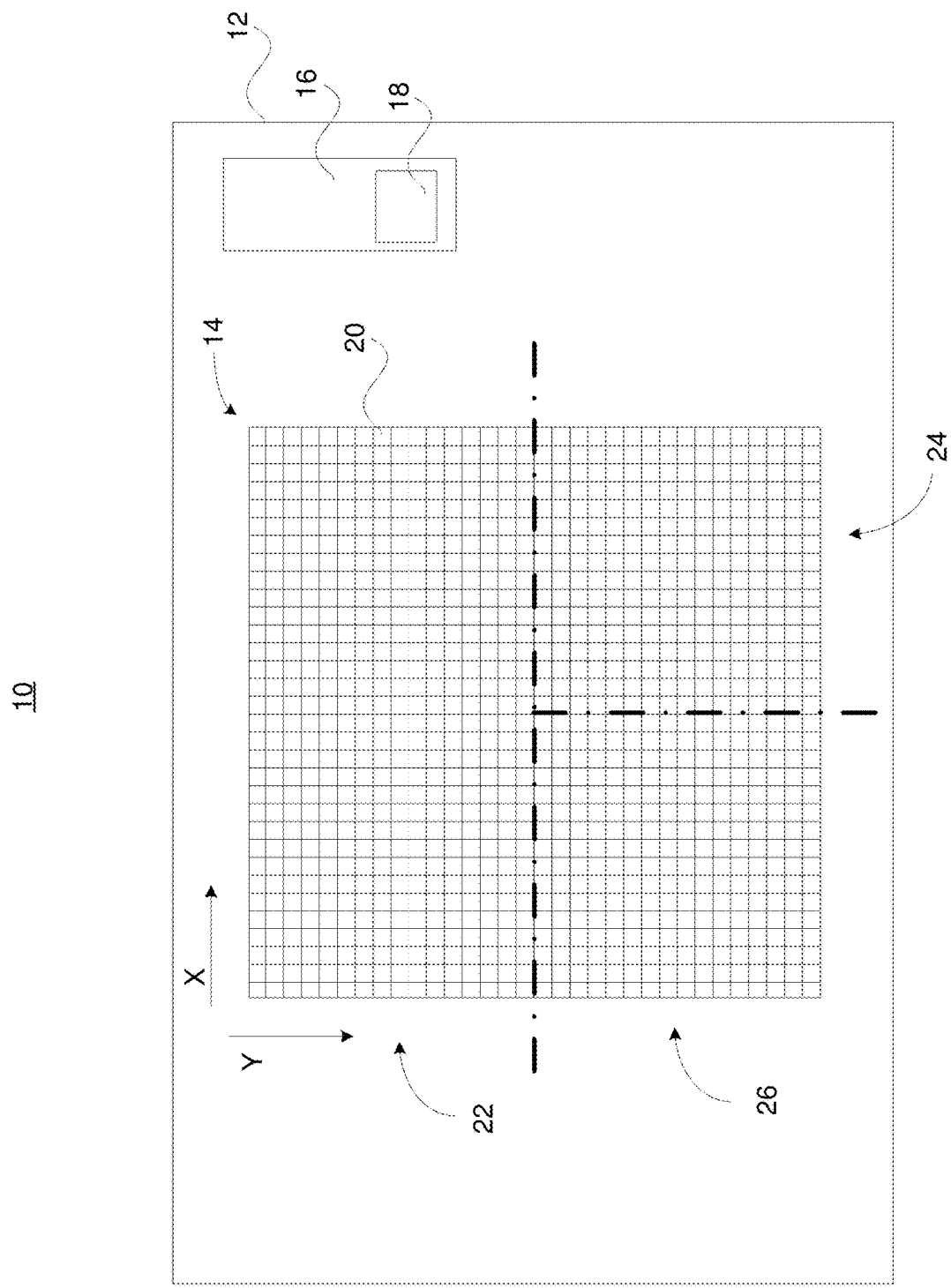
FIG. 1 is a front view of a light emitting diode (LED) array for a vehicle headlamp.

Turning to FIG. 1, an example of a light source 10 is generally illustrated. The light source 10 is an example of a light emitting chip with pixel control electronics. The light source 10 may be implemented using the known hybrid smart controllable high-resolution LED, marketed under the trade designation Eviyos, by Osram Opto Semiconductors (Regensburg Germany). The light source 10 includes a substrate 12 and a light emitting diode (LED) array 14. The substrate 12 may be printed circuit board that carries the LED array 14, control electronics 16, and LED drivers 18.

The LED array 14 includes a number of LEDs 20 that are organized by columns along an x-axis and rows along a y-axis. The LED array 14 may include 32 rows and 32 columns, which forms an LED array of 1,024 LEDs, with a pitch of 125 micrometers between adjacent LEDs 20. In other implementations a fewer number or greater number of LEDs 20 may be used. The LEDs 20 that are organized in the LED array 14 may also be referred to as pixels or LED pixels, as is known in the art. The footprint of the LED array 14 may be approximately 4 mm×4 mm, and the LED array 14 may be adapted to emit 3000 lumens.

The control electronics 16 may allow for individual ones of the LEDs 20 to be independently driven within the LED array 14. The LED array 14 may be configured to be operated or driven as three (3) different regions. The LED array 14 may be logically partitioned to selectively emit light from a first region of LEDs 22, from a second region of LEDs 24, and from a third region of LEDs 26. The first region of LEDs 22 may include an upper half of the number of LEDs 20, or an upper half of the LED array 14. The first region of LEDs 22 may include rows 1-16, rows 1-10, or approximately the upper half of the LEDs 20. The second region of LEDs 24 may include a lower quadrant of the LED array 14 and may include columns 17-32 of rows 17-32 of the LED array 14. The second region of LEDs 24 may include approximately one-fourth of the LEDs 20 (±10%). The third region of LEDs 26 may include a lower quadrant of the LED array 14 and may include columns 1-16 of rows 17-32 of the LED array 14. The third region of LEDs 26 may include approximately one-fourth of the LEDs 20 (±10%).

Figure 2:
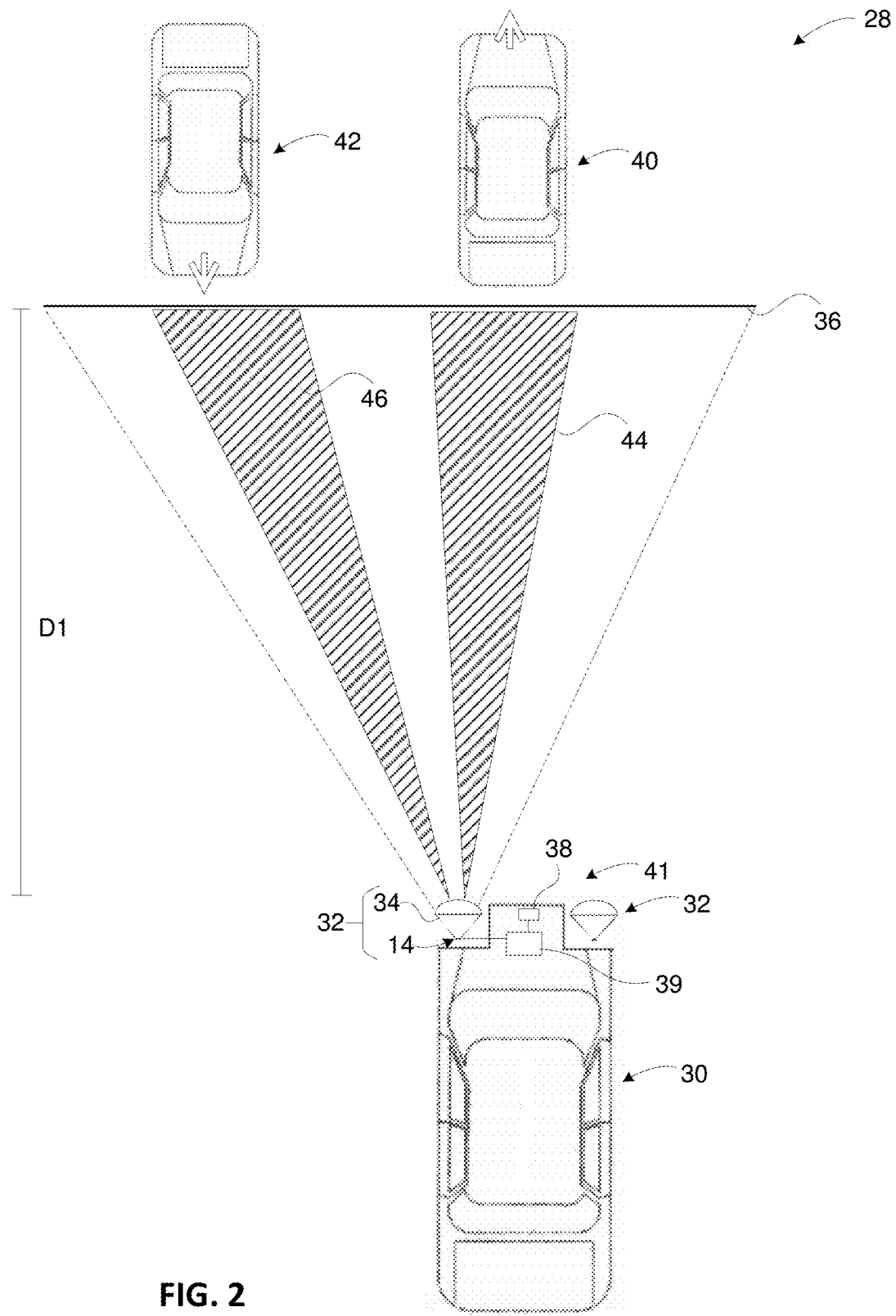
FIG. 2 diagrammatically illustrates use of a tri-region optical lens in an automotive lamp, consistent with at least one embodiment of the present disclosure.

Turning to FIG. 2, an example automotive environment 28 is generally illustrated, consistent with the present disclosure. The automotive environment 28 illustrates an adaptive front light interaction between a vehicle 30, an ongoing vehicle 40, and an oncoming vehicle 42, according to an embodiment. The vehicle 30 includes an automotive lamp 32. The automotive lamp 32 includes a lens 34 coupled to and illuminated by the LED array 14. The lens 34 may be adapted to image a field of illumination 36. The field of illumination 36 may be approximately rectangular and is a distance D1 from the automotive lamp 32. The distance D1 may be relatively close to the vehicle 30 (e.g., 10 feet or about 0.3 meter), or the distance D1 may be relatively far from the vehicle 30 (e.g., 300 ft or about 9 meters).

The vehicle 30 may be configured, as known in the art, to adapt the field of illumination 36 based on the detection of the ongoing vehicle 40, the oncoming vehicle 42, or both the ongoing vehicle 40 and the oncoming vehicle 42 within the field of illumination 36. The vehicle 30 may include a sensor 38 for detecting the presence of the ongoing vehicle 40 and/or the presence of the oncoming vehicle 42. The sensor 38 may be an image sensor, a thermal sensor, radar, lidar, sonar, or the like, according to various implementations. In response to detecting the ongoing vehicle 40, the vehicle 30 may be configured to turn off the one or more of the LEDs 20 of the LED array 14 to dim or otherwise de-illuminate a region 44 within the field of illumination 36. In response to detecting the oncoming vehicle 42, the vehicle 30 may be configured to turn off one or more of the LEDs 20 of the LED array 14 to dim or otherwise de-illuminate a region 46 within the field of illumination 36. The vehicle 30 may use a light source controller 39 that is coupled between the LED array 14 and the sensor 38, to adapt the field of illumination 36 based on data from the sensor 38. An automotive lighting system 41 may include the automotive lamp 32, the sensor 38, and the light source controller 39. A person of ordinary skill in the art is familiar with sensors and light source controllers, so simplified renderings are provided to represent the sensor 38 and the light source controller 39. The sensor 38 and the light source controller 39 may be configured using known techniques for providing adaptive front lighting system functionality to the vehicle 30.

Figure 3A:
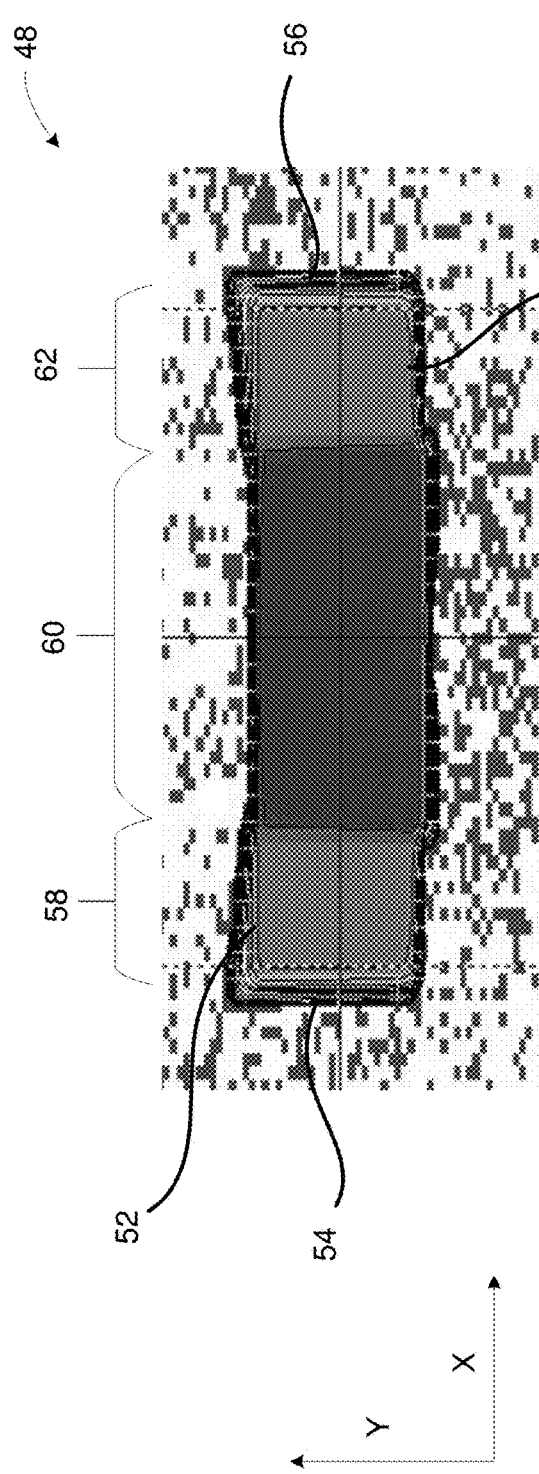
FIG. 3A simulates an entire field of illumination for a lamp consistent with FIG. 2.

Turning now to FIGS. 3A-3D, simulations of the field of illumination 36 (e.g., a road illumination) for the automotive lamp 32 were performed. FIG. 3A illustrates a simulation of a field of illumination 48, consistent with embodiments of the disclosure. The field of illumination 48 is one simulated implementation of the field of illumination 36, according to an embodiment. The field of illumination 48 is approximately rectangular, and includes a bottom edge 50, a top edge 52, a left edge 54, and a right edge 56. The bottom edge 50 and the top edge 52 are approximately perpendicular to each other, and the left edge 54 is approximately perpendicular to the right edge 56. The bottom edge 50 and the top edge 52 are approximately parallel to the x-axis, the left edge 54 and the right edge 56 are approximately parallel to the y-axis, and the bottom edge 50 is approximately perpendicular to the right edge 56. The field of illumination is approximately rectangular and may have rounded corners.

The field of illumination 48 includes a left region 58, a middle region 60, and a right region 62. The lens 34 is configured to image the left region 58 adjacent to the middle region 60, and is configured to image the right region 62 adjacent to the middle region 60. The left region 58 is abutted to the left side of the middle region 60, and the right region 62 is abutted to the right side of the middle region 60, so that the sum of the left region 58, the middle region 60, and the right region 62 forms the field of illumination 48.

Figure 3D:
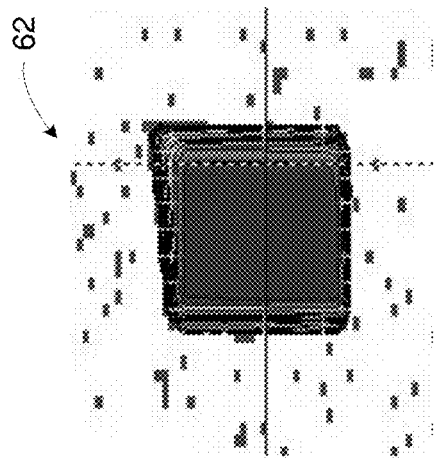
FIG. 3D simulates a right region field of illumination, consistent with FIG. 2.
Figure 3C:
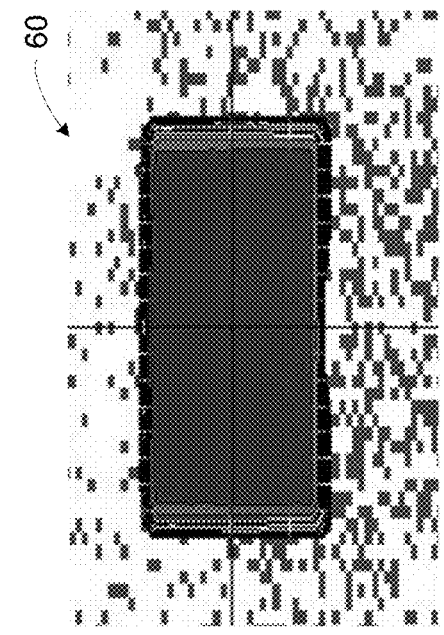
FIG. 3C simulates a middle region field of illumination, consistent with FIG. 2.
Figure 3B:
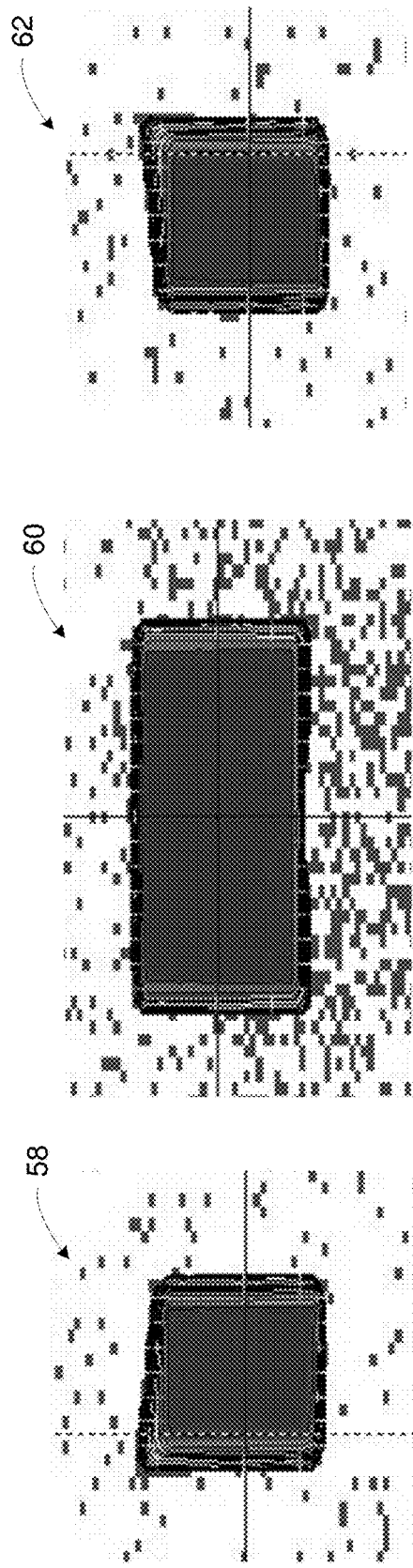
FIG. 3B simulates a left region field of illumination, consistent with FIG. 2.

FIGS. 3B, 3C, and 3D illustrate individual simulations of the left region 58, the middle region 60, and the right region 62, respectively.

Figure 4:
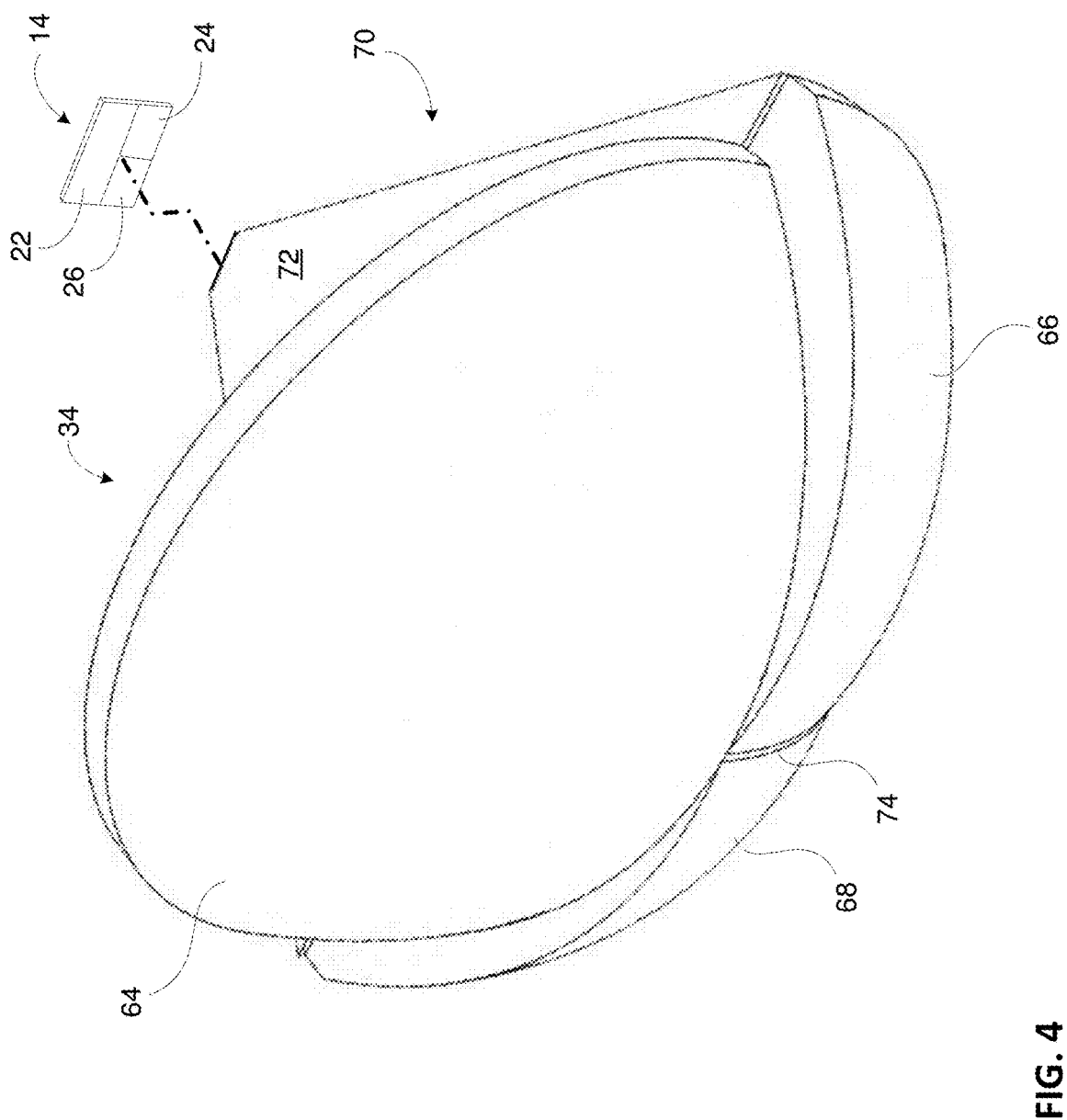
FIG. 4 is a perspective view of an embodiment of the FIG. 2 tri-region optical lens.
Figure 5:
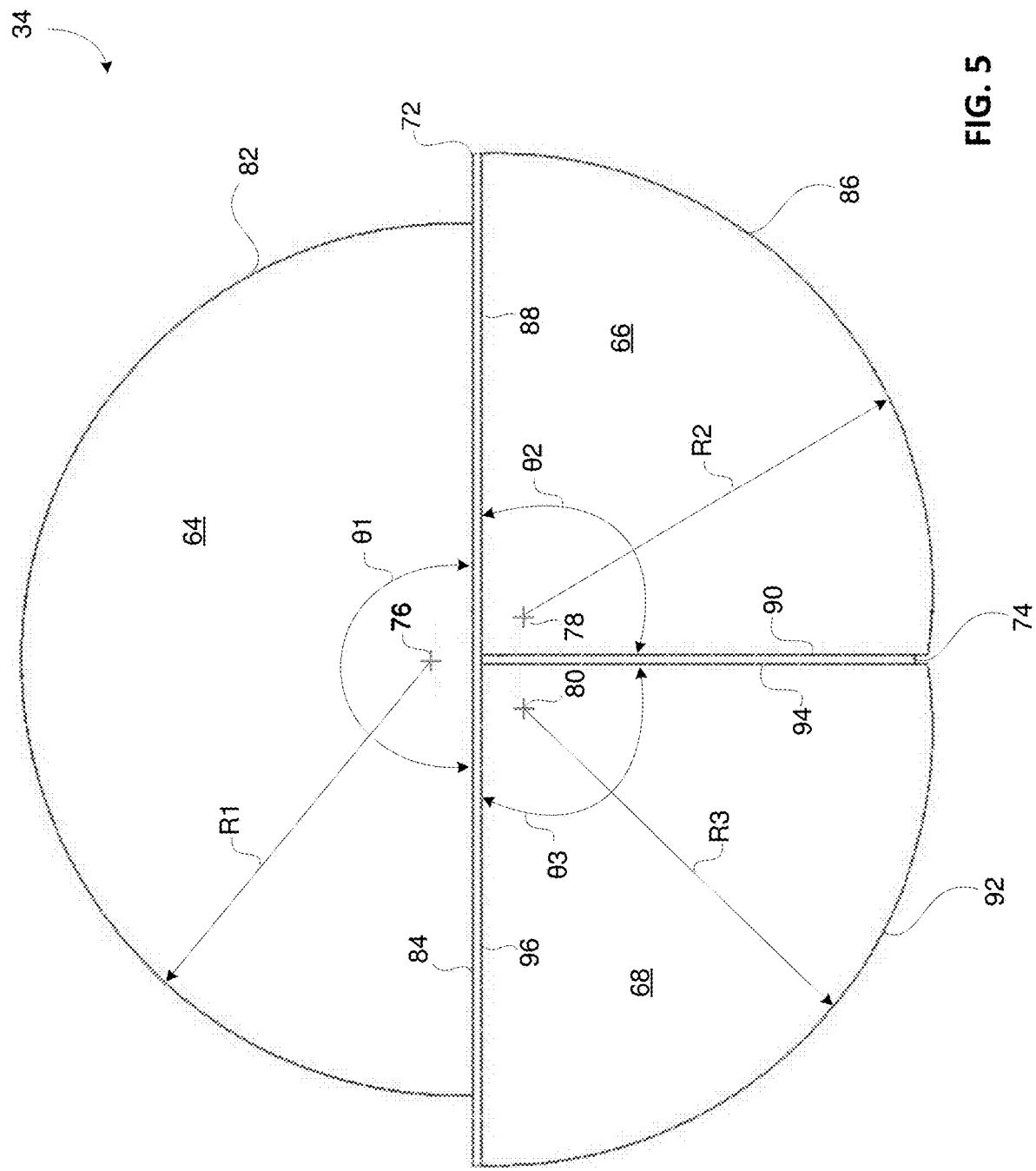
FIG. 5 is a front view of one embodiment of the tri-region optical lens of FIG. 4.
Figure 6:
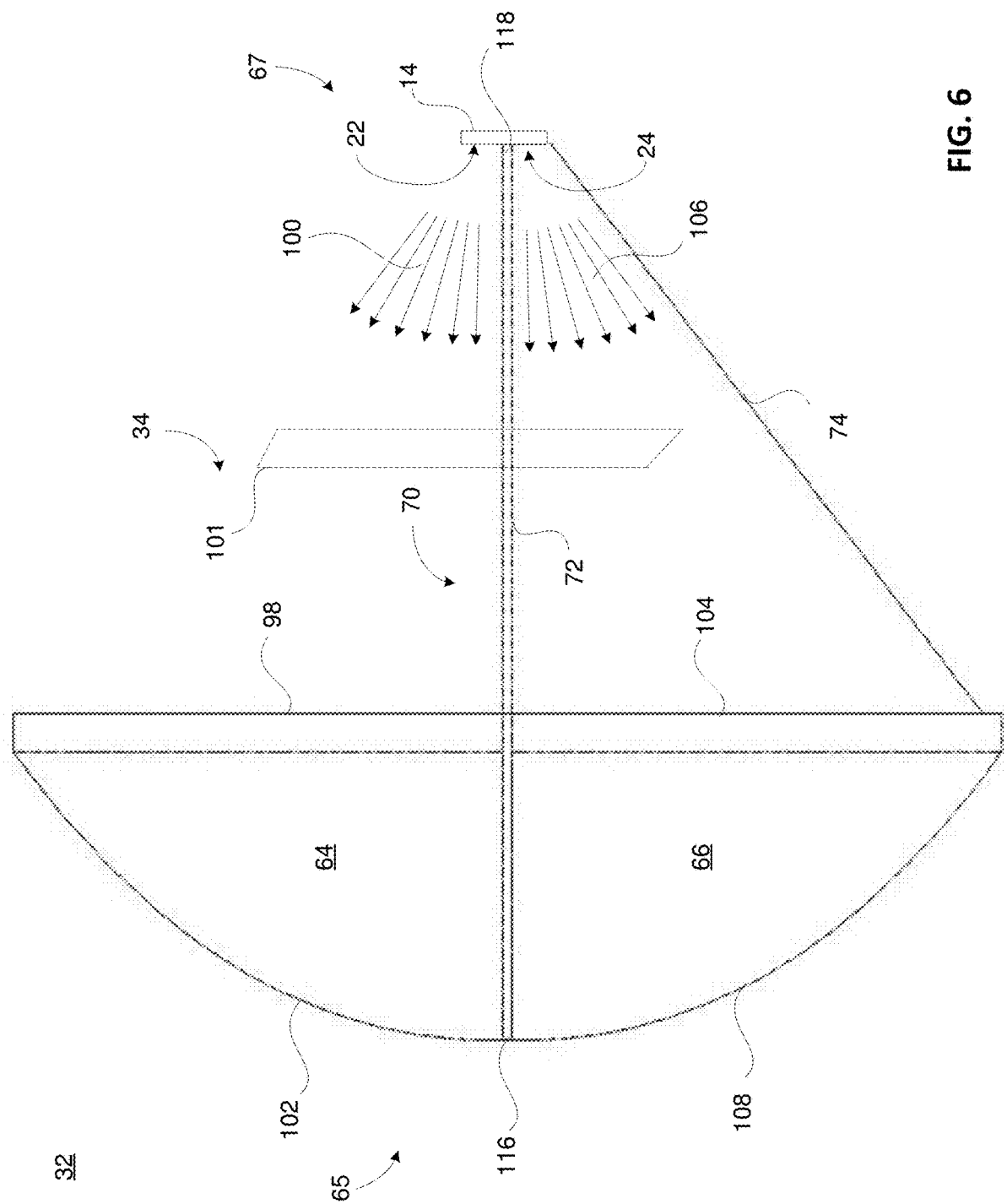
FIG. 6 is a left-side view of an embodiment of the tri-region optical lens of FIG. 4.
Figure 7:
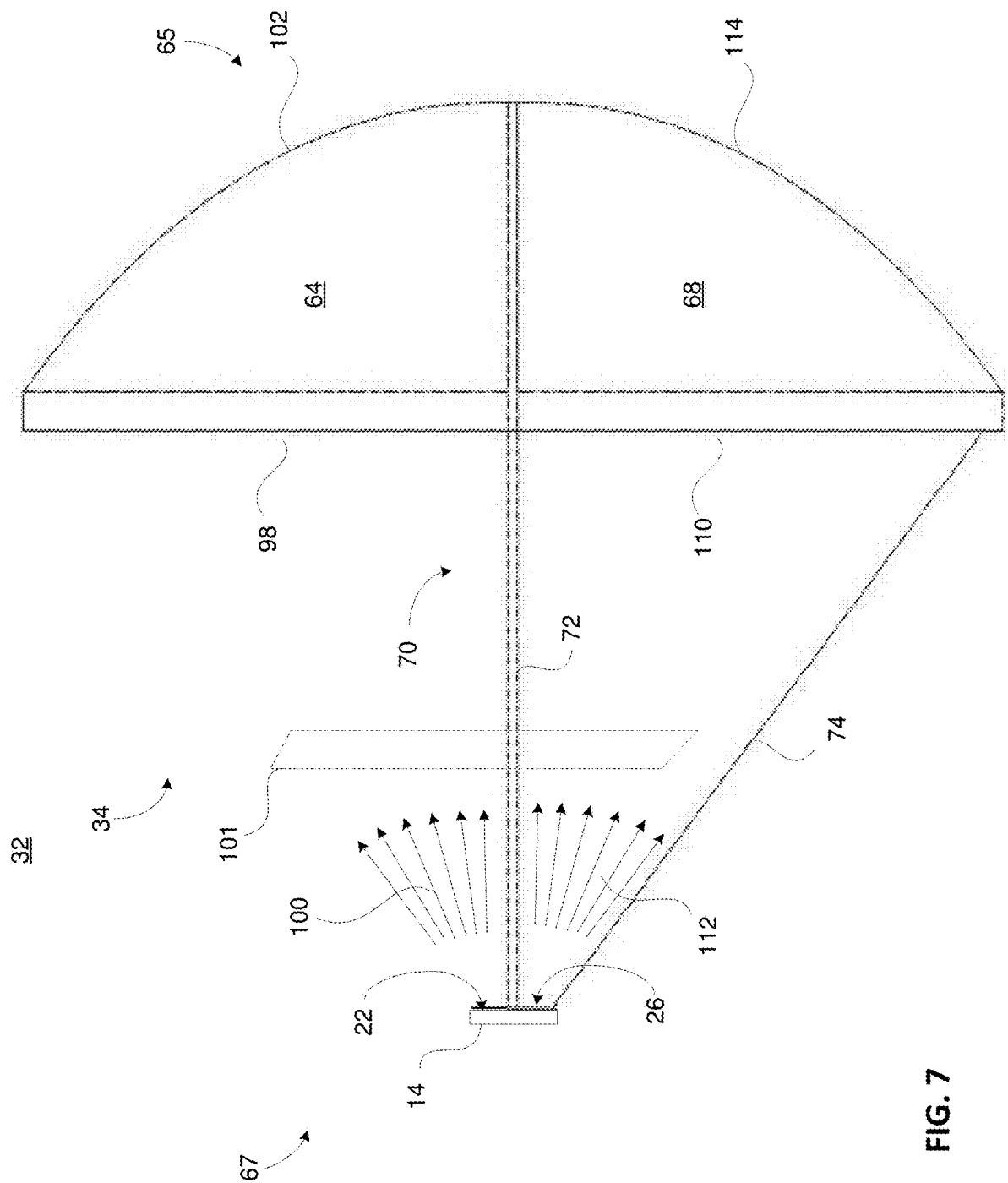
FIG. 7 is a right-side view of an embodiment of the tri-region optical lens of FIG. 4.
Figure 8:
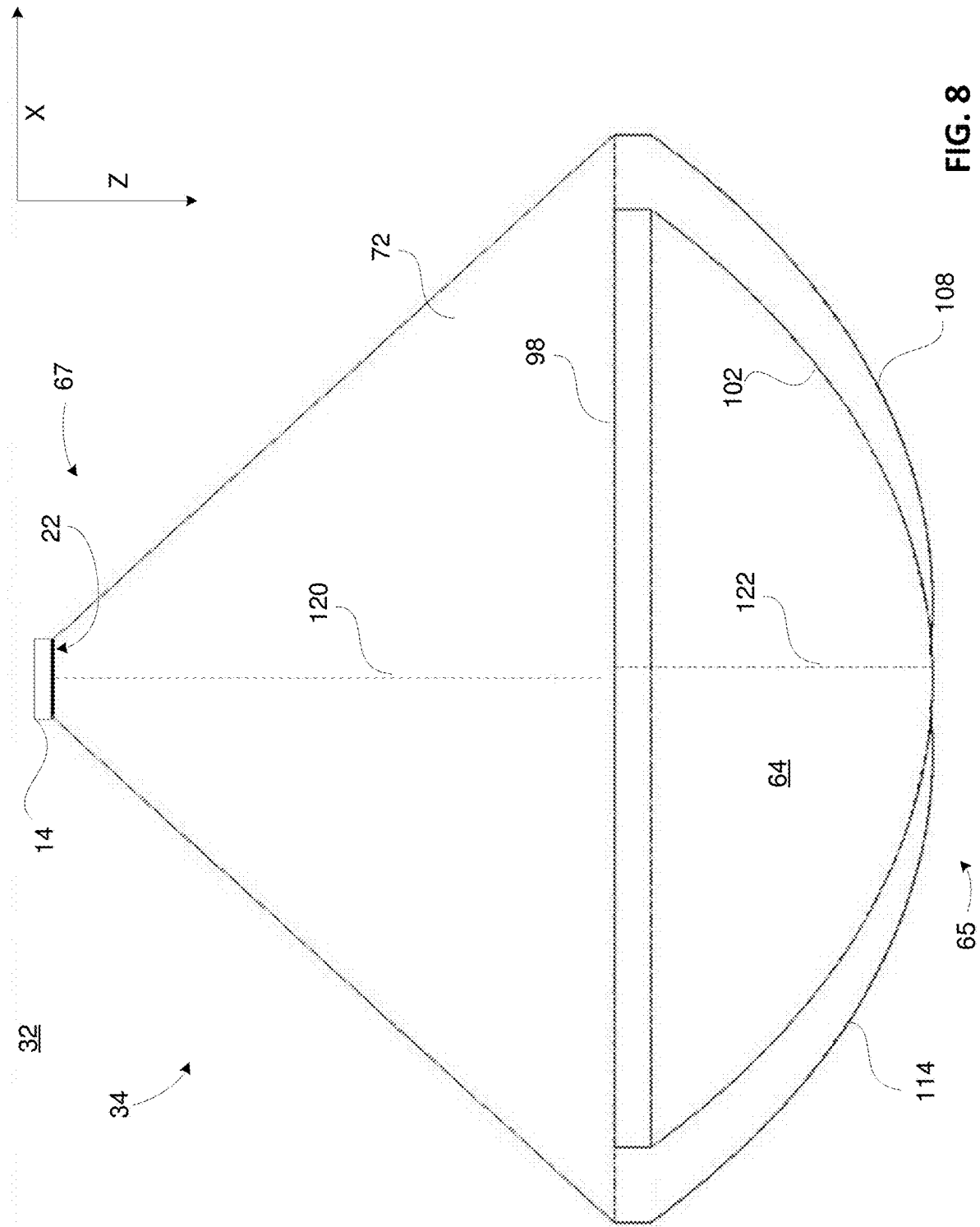
FIG. 8 is a top view of an embodiment of the tri-region optical lens of FIG. 4.
Figure 9:
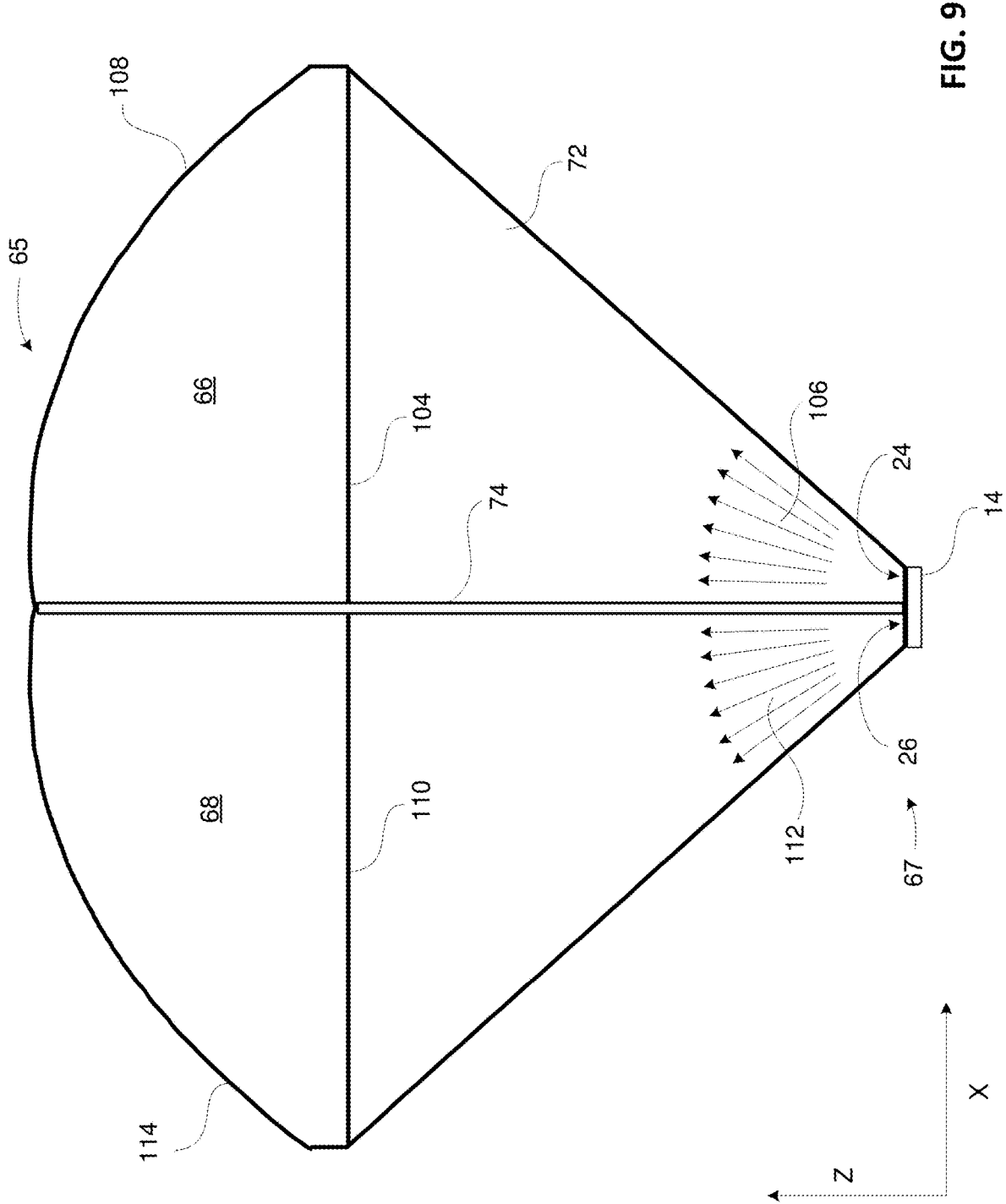
FIG. 9 is a bottom view of an embodiment of the tri-region optical lens of FIG. 4.

Turning now to FIGS. 4-9, one embodiment of an automotive lamp 32 consistent with the present disclosure is generally illustrated. In particular, FIG. 4 is a perspective view, FIG. 5 is a front view, FIG. 6 is a left-side view, FIG. 7 is a right-side view, FIG. 8 is a top view, and FIG. 9 is a bottom view of the automotive lamp 32. The automotive lamp 32 includes the LED array 14 and the lens 34 and may be particularly suited for use as an automotive headlight. The lens 34 is an imaging lens that focuses input light from the LED array 14 into the field of illumination 36. The lens 34 includes a light-transmissive first optical region 64, a light-transmissive second region 66, and a light-transmissive third optical region 68. The light-transmissive first optical region 64, the light-transmissive second optical region 66, and the light-transmissive third optical region 68 are separated from each other by a baffle 70 (best seen in FIGS. 5-7). The baffle 70 is configured to reduce or obstruct light from spreading from any of the light-transmissive first, second, and third optical regions 64, 66, 68 to any other light-transmissive first, second, and third optical regions 64, 66, 68. The baffle 70 includes an opaque first member 72 and an opaque second member 74. The opaque first member 72 and the opaque second member 74 extend from the light emission surfaces 102, 108, 114 to the light receiving surfaces 98, 104, 110. More particularly, the opaque first member 72 extends from the light emission surfaces 102, 108, 114, and from the light receiving surfaces 98, 104, 110 to the LED array 14; and the opaque second member 74 extends from the light emission surfaces 102, 108, 114, and from the light receiving surfaces 98, 104, 110 to the LED array 14. The opaque first member 72 and the opaque second member 74 extend generally from a front 65 of the automotive lamp 32 to a rear 67 of the automotive lamp 32. The opaque first member 72 and the opaque second member 74 preferably extend from the front 65 of the automotive lamp 32 to the LED array 14.

The first, second, and third regions of LEDs 22, 24, 26 of the LED array 14 emit light to the corresponding light-transmissive first, second, and third regions 64, 66, 68, respectively. The LED array 14 is coupled to the baffle 70 so that light emitted by the first region of LEDs 22 does not spread into the light-transmissive second or third optical regions 66, 68. The LED array 14 is coupled to the baffle 70 so that light emitted by the second region of LEDs 24 is not spread into the light-transmissive first or third optical regions 64, 68. The LED array 14 is coupled to the baffle 70 so that light emitted by the third region of LEDs 26 is not spread into the light-transmissive first or second optical regions 64, 66. The baffle 70 is opaque to reduce or prevent light transmission through the baffle.

The light-transmissive first optical region 64, the light-transmissive second region 66, and the light-transmissive third optical region 68 are each plano-convex lenses.

Turning now to FIG. 5, the baffle 70 includes an opaque first member 72 and an opaque second member 74. The opaque first member 72 is positioned transverse to the opaque second member 74. The opaque first member 72 may be a horizontal member and the opaque second member 74 may be a vertical member that is perpendicularly coupled to the horizontal member. The opaque first member 72 is coupled between the light-transmissive first optical region 64, on the one side, and the light-transmissive second optical region 66 and light-transmissive third optical region 68, on the other side. The opaque second member 74 is coupled between the light transmissive second optical region 66 and the light-transmissive third optical region 68, to reduce or prevent light from spreading between the light-transmissive second optical region 66 and the light-transmissive third optical region 68. The opaque first member 72, the opaque second member 74, the light-transmissive first optical region 64, the light-transmissive second optical region 66, and the light-transmissive third optical region 68 may be manufactured as a single unitary body, according to one embodiment. The opaque first member 72 and the opaque second member 74 may be manufactured from an opaque material (e.g., metal) or the opaque first member 72 and the opaque second member 74 may be coated with a non-light-transmissive opaque coating (e.g., black spray paint). The opaque first member 72 and the opaque second member 74 are preferably manufactured from or coated with a matte material to reduce the reflectivity of the surfaces of the opaque first member 72 and the opaque second member 74.

Each of the light-transmissive first, second, and third optical regions 64, 66, and 68 include optical centers that are offset from the opaque first member 72 and the opaque second member 74. The light-transmissive first optical region 64 includes a first optical center 76, the light-transmissive second optical region 66 includes a second optical center 78, and the light-transmissive third optical region 68 includes a third optical center 80. The first, second, and third optical centers 76, 78, 80 transmit light directly through the light-transmissive first, second, and third optical regions 64, 66, 68. The light-transmissive first optical region 64 includes a first radius R1 measured from the first optical center 76 to a first arcuate edge 82. The first arcuate edge 82 extends around the first optical center 76 with a first arc angle θ1. The first arc angle θ1 is greater than 180 degrees and less than 270 degrees. The first arcuate edge 82 terminates at a first straight edge 84. The light-transmissive first optical region 64 includes a first periphery that is at least partially defined by the first arcuate edge 82 and the first straight edge 84.

The light-transmissive second optical region 66 includes a second radius R2 measured from the second optical center 78 to a second arcuate edge 86. The second arcuate edge 86 extends around the second optical center 78 with a second arc angle θ2. The second arc angle θ2 is greater than 90 degrees and less than 100 degrees, so that the second optical center 78 is offset from a second straight edge 88 and from a third straight edge 90. The second arcuate edge 86 terminates at the second straight edge 88 and at the third straight edge 90. The light-transmissive second optical region 66 includes a second periphery that is at least partially defined by the second arcuate edge 86, the second straight edge 88, and the third straight edge 90.

The light-transmissive third optical region 68 includes a third radius R3 measured from the third optical center 80 to a third arcuate edge 92. The third arcuate edge 92 extends around the third optical center 80 with a third arc angle θ3. The third arc angle θ3 is greater than 90 degrees and less than 100 degrees, so that the third optical center 80 is offset from a fourth straight edge 94 and from a fifth straight edge 96. The third arcuate edge 92 terminates at the fourth straight edge 94 and at the fifth straight edge 96. The light-transmissive third optical region 66 includes a third periphery that is at least partially defined by the third arcuate edge 92, the fourth straight edge 94, and the fifth straight edge 96.

Each of the light-transmissive first, second and third optical regions 64, 66, 68 is a solid arcuate section each defined by a plurality of curves extending about respective first, second, and third optical axes 76, 78, 80 of the light-transmissive first, second and third optical regions 64, 66, 68. The first, second, and third optical axes 76, 78, 80 are offset from one another.

Turning now to FIG. 6, the light-transmissive first optical region 64 includes a first light receiving surface 98 adapted to receive a first field of illumination 100 from a first region of LEDs 22 of the LED array 14. The light-transmissive first optical region 64 includes a first light emitting surface 102 to image the middle region 60 of the field of illumination 48 (shown in FIG. 3A) from the first field of illumination 100. The light-transmissive second optical region 66 includes a second light receiving surface 104 adapted to receive a second field of illumination 106 from a second region of LEDs 24 of the LED array 14. The light-transmissive second optical region 66 includes a second light emitting surface 108 to image the left region 58 of the field of illumination 48 (shown in FIG. 3B) from the second field of illumination 106.

Turning now to FIG. 7, the light-transmissive third optical region 68 includes a third light receiving surface 110 adapted to receive a third field of illumination 112 from a third region of LEDs 26 of the LED array 14. The light-transmissive third optical region 68 includes a third light emitting surface 114 to image the right region 62 of the field of illumination 48 (shown in FIG. 3A) from the third field of illumination 112. The first, second, and third fields of illumination 100, 104, and 112 combine to form a square field of illumination 101 that is imaged or transformed into an approximately rectangular field of illumination 46, by the lens 34.

As illustrated in FIGS. 6 and 7, the opaque first member 72 of the baffle 70 may extend from the first, second, and third light emitting surfaces 102, 108, 114, on a lens end 116, to the LED array 14, on a light source end 118. The opaque second member 74 may taper from the second and third light receiving surfaces 104, 110, to the LED array 14. The opaque first member 72 and the opaque second member 74 are configured such that when the LED array 14 is energized, the light-transmissive first optical region 64 receives substantially only the first field of illumination 100, the light-transmissive second optical region 66 receives substantially only the second field of illumination 106, and the light-transmissive third optical region 68 receives substantially only the third field of illumination 112. The first, second, and third light receiving surfaces 98, 104, 110 are planar in one implementation, such that the light-transmissive first, second, and third optical regions 64, 66, 68 are each plano-convex lenses. The first, second, and third light receiving surfaces 98, 104, 110 are convex in one implementation, such that the light-transmissive first, second, and third optical regions 64, 66, 68 are each biconvex lenses.

Turning now to FIG. 8, by way of a non-limiting example, a top profile of the light-transmissive first optical region 64 illustrates that the first light emitting surface 102 is aspherical. The surface profile of the first light emitting surface 102 in the Z axis as a function of the X axis may be characterized by the following polynomial equation (1):

$$Z = -3.6325E\text{-}09X^6 - 2.1530E\text{-}07X^5 - 1.1080E\text{-}05X^4 - 1.0225E\text{-}04X^3 - 2.1630E\text{-}02X^2 - 1.5462E\text{-}03X + 6.4995E\text{+}01 \quad (1)$$

Turning now to FIG. 9, by way of a non-limiting example, a bottom profile of the light-transmissive second and third optical regions 66, 68 illustrates that the second and third light emitting surfaces 108, 114 are aspherical. The surface profile of the second and third light emitting surfaces 108, 114 in the Z axis as a function of the X axis may be characterized by the above noted polynomial equation (1).

As illustrated in FIGS. 8 and 9, the opaque second member 74 of the baffle 70 may extend from the second and third light emitting surfaces 108, 114, on the lens end 116, to the LED array 14, on the light source end 118. The opaque first member 72 may taper from the second and third light receiving surfaces 104, 110, to the LED array 14.

The dimensions of the light-transmissive first, second, and third optical regions 64, 66, 68 may be defined by a diameter (i.e., 2 times R1, R2, or R3) of 50 mm, a focal length 120 of 30 mm, and a thickness 122 of 2 mm.

Advantageously, embodiments herein enable that vehicle 30 can utilize for each headlight (one left-side, one right-side) only one automotive lamp 32 having lens 34 and one light source 10 having one LED array 14, which can be realized with just one commercially available Eviyos LED chip of the type described hereinabove.

While several embodiments of the present disclosure have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present disclosure. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present disclosure is/are used.

Those skilled in the art will recognize, or be able to ascertain using no more than routine experimentation, many equivalents to the specific embodiments of the disclosure described herein. It is, therefore, to be understood that the foregoing embodiments are presented by way of example only and that, within the scope of the appended claims and equivalents thereto, the disclosure may be practiced otherwise than as specifically described and claimed. The present disclosure is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, are understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

An abstract is submitted herewith. It is pointed out that this abstract is being provided to comply with the rule requiring an abstract that will allow examiners and other searchers to quickly ascertain the general subject matter of the technical disclosure. It is submitted with the understanding that it will not be used to interpret or limit the scope or meaning of the claims, as set forth in the rules of the U.S. Patent and Trademark Office.

The following non-limiting reference numerals are used in the specification:

10 light source
12 substrate
14 LED array
16 control electronics
18 LED drivers
20 LED
22 first region
24 second region
26 third region
28 automotive environment
30 vehicle
32 automotive lamp
34 lens
36 field of illumination
38 sensor
39 light source controller
40 ongoing vehicle
41 automotive lighting system
42 oncoming vehicle
44 first region of field of illumination
46 second region of field of illumination
48 field of illumination 50 bottom edge
52 top edge
54 left edge
56 right edge
58 left region
60 middle region
62 right region
64 light-transmissive first optical region
65 front
66 light-transmissive second optical region
67 rear
68 light-transmissive third optical region
70 baffle
72 opaque first member
74 opaque second member
76 first optical center
78 second optical center
80 third optical center
82 first arcuate edge
84 first straight edge
86 second arcuate edge
88 second straight edge
90 third straight edge
92 third arcuate edge
94 fourth straight edge
96 fifth straight edge
98 first light receiving surface
100 first field of illumination
101 square field of illumination
102 first light emitting surface
104 second light receiving surface
106 second field of illumination
108 second light emitting surface
110 third light receiving surface
112 third field of illumination
114 third light emitting surface
116 lens end
118 light source end
120 focal length
122 thickness
D1 distance
R1 first radius
R2 second radius
R3 third radius
θ1 first arc angle
θ2 second arc angle
θ3 third arc angle

I claim:

1. An automotive lighting system (41), comprising:
a lens (34) to focus light (101) from a light source (10), the lens (34) including:
a light-transmissive first region (64) being configured to receive a first portion of the light (100) from the light source (10) when energized and transmit the first portion of the light (100) though the lens (34);
a light-transmissive second region (66) arranged adjacent to the light-transmissive first region (64), the light-transmissive second region (66) being configured to receive a second portion of the light (106) from the light source (10) when energized and transmit the second portion of the light (106) through the lens (34);
a light-transmissive third region (68) arranged adjacent to the light-transmissive first region (64) and adjacent to the light-transmissive second region (66), the light-transmissive third region (68) being configured to receive a third portion of the light (112) from the light source (10) when energized and transmit the third portion of light (112) through the lens (34); and
a baffle (70) including an opaque first member (72) disposed transverse to an opaque second member (74), the opaque first member (72) being disposed between the light-transmissive first region (64) and the light-transmissive second and third regions (66; 68), and the opaque second member (74) being disposed between the light-transmissive second region (66) and the light-transmissive third region (68);
wherein the baffle (70) extends transverse to light receiving surfaces (98, 104, 110) of the light-transmissive first, second, and third regions (64, 66, 68), to obstruct a spreading of the light (101) between the light-transmissive first, second, and third regions (64, 66, 68).

2. The automotive lighting system (41) of claim 1, wherein the lens (34) is an imaging lens.

3. The automotive lighting system (41) of claim 1, wherein a field of illumination (48) imaged by the lens (34) when receiving light from the light source (10), when energized, comprises a middle region (60), a left region (58) abutting the middle region (60), and a right region (62) abutting the middle region (60), wherein the middle region (60), the left region (58), and the right region (62) combine to define a generally rectangular shaped field of illumination (48) when projected on a flat surface, each of the middle region (60), the left region (58), and the right region (62) have a top and a bottom edge extending generally parallel to each other along an x-axis and a first and a second lateral edge each extending generally parallel to each other along a y-axis, the x-axis being orthogonal to the y-axis.

4. The automotive lighting system (41) of claim 3, wherein the generally rectangular shaped field of illumination includes rounded corners.

5. The automotive lighting system (41) of claim 3,
wherein the light-transmissive first region (64) is configured to image the first portion of the light (100) from the light source (10) into the middle region (60) of the field of illumination (48),
wherein the light-transmissive second region (66) is configured to image the second portion of the light (106) from the light source (10) into the left region (58) of the field of illumination (48), and
wherein the light-transmissive third region (68) is configured to image the third portion of the light (112) from the light source (10) into the right region (62) of the field of illumination (48).

6. The automotive lighting system (41) of claim 1, wherein light emission surfaces (102, 108, 114) of each of the light-transmissive first region (64), the light-transmissive second region (66) and the light-transmissive third region (68) are aspherical.

7. The automotive lighting system (41) of claim 6, wherein each of the light-transmissive first, second and third regions (64, 66, 68) of the lens (34) is a solid arcuate section each defined by a plurality of curves extending about respective first, second, and third optical axes (76, 78, 80) of the light transmissive first, second and third regions (64, 66, 68), the first, second, and third optical axes (76, 78, 80) of each of the light transmissive first, second and third regions (64, 66, 68) being offset from one another.

8. The automotive lighting system (41) of claim 6, wherein the aspherical light emission surface (102) of the light-transmissive first region (64) includes a first periphery defined by a first straight edge (84) and a first arcuate edge

(82) having a first arc angle (θ1) that is greater than 180 degrees and less than 270 degrees centered around a first optical axis (76) of the light-transmissive first region (64), wherein the aspherical light emission surface (108) of the light-transmissive second region (66) includes a second periphery defined by a second straight edge (88), a third straight edge (90), and a second arcuate edge (86) having a second arc angle (θ2) that is greater than 80 degrees and less than 100 degrees centered around a second optical axis (78) of the light-transmissive second region (66), and wherein the aspherical light emission surface (114) of the light-transmissive third region (68) includes a third periphery defined by a fourth straight edge (94), a fifth straight edge (96), and a third arcuate edge (92) having a third arc angle (θ3) that is greater than 80 degrees and less than 100 degrees centered around a third optical axis (80) of the light-transmissive third region (68).

9. The automotive lighting system (41) of claim 6, wherein the light emission surfaces (102, 108, 114) are convex outwardly arcuate.

10. The automotive lighting system (41) of claim 1, wherein the light-transmissive first region (64), the light-transmissive second region (66), the light-transmissive third region (68), and the baffle (70) constitute a unitary body of the lens (34).

11. The automotive lighting system (41) of claim 10, wherein the baffle (70) includes a non-light transmissive coating.

12. The automotive lighting system (41) of claim 1, wherein the opaque first member (72) is a horizontal member and the opaque second member (74) is a vertical member perpendicularly coupled to the horizontal member.

13. The automotive lighting system (41) of claim 1, wherein the opaque first member (72) includes a lens end (116) proximate a light-emitting exterior surface of the light-transmissive second and third regions (66, 68) and a light source end (118) proximate a light input side of the lens (34), wherein the opaque first member (72) is at least partially tapered from the lens end (116) to the light source end (118), and wherein the opaque second member (74) includes a lens end (116) proximate a light-emitting exterior surface of the light-transmissive first region (64) and a light source end (118) proximate a light input side of the lens (34), wherein the opaque second member (74) is at least partially tapered from the lens end (116) to the light source end (118).

14. The automotive lighting system (41) of claim 1, wherein a first intersection between an aspherical light emission surface (102) and a planar light input surface (98) of the light-transmissive first region (64) is defined by a first arc (82) having a first radius (R1) centered around a first optical axis (76) of the light-transmissive first region (64);

a second intersection between an aspherical light emission surface (108) and a planar light input surface (104) of the light-transmissive second region (66) is defined by a second arc (86) having a second radius (R2) centered around a second optical axis (78) of the light-transmissive second region (66); and a third intersection between an aspherical light emission surface (114) and a planar light input surface (110) of the light-transmissive third region (68) is defined by a third radius (R3) centered around a third optical axis (80) of the light-transmissive third region (68).

15. The automotive lighting system (41) of claim 1, further comprising:
the light source (10);
a sensor (38) to detect at least one of an oncoming vehicle (42) and an ongoing vehicle (40); and
a light source controller (39) coupled to the light source (10), the light source controller (39) to selectively operate a plurality of LEDs (20) of the light source (10) to manipulate characteristics of the field of illumination (48), in response to detection of the oncoming vehicle (42) or the ongoing vehicle (40) by the sensor (38).

16. The automotive lighting system (41) of claim 1, further comprising the light source (10), wherein the light source (10) includes an array (14) of a plurality of LEDs (20) that are packaged on a single chip (12).

17. The automotive lighting system (41) of claim 1, further comprising the light source (10), wherein the light source (10) comprises at least 1,024 LEDs (20) which are disposed on a single printed circuit board (12) in a region having a footprint not exceeding 4 mm×4 mm.

18. The automotive lighting system (41) of claim 1, further comprising the light source (10), wherein the light source (10) has a luminous flux of at least 3000 lumens.

19. The automotive lighting system (41) of claim 1, wherein each of the light-transmissive first, second, and the third regions (64, 66, 68) are plano-convex lenses.

20. The automotive lighting system (41) of claim 1, wherein the opaque first member (72) and the opaque second member (74) are configured such that when the light source (10) is energized, the light-transmissive first region (64) receives substantially only the first portion of light (100) from the light source (10), the light-transmissive second region (66) receives substantially only the second portion of the light (106) from the light source (10), and the light-transmissive third region (68) receives substantially only the third portion of the light (112) from the light source (10).

21. The automotive lighting system (41) of claim 1, wherein the lens (34) is configured to image an approximately square field of illumination (101) of the light source (10) into an approximately rectangular field of illumination (48) of the lens (34).

22. The automotive lighting system (41) of claim 1, wherein the opaque first member (72) and the opaque second member (74) each extend between respective pairs of the light receiving surfaces (98, 104, 110) and light emission surfaces (102, 108, 114) of each of the light-transmissive first region (64), the second region (66) and the third region (68).

23. The automotive lighting system (41) of claim 1, further comprising:
the light source (10); and
wherein the opaque first member (72) and the opaque second member (74) are disposed adjacent the light receiving surfaces (98, 104, 110) of the first, second and third regions (64, 66, 68) that are facing the light source (10).

24. The automotive lighting system (41) of claim 1, further comprising:
the light source (10); and
wherein the opaque first member (72) and the opaque second member (74) extend between the light source (10) and light emission surfaces (102, 108, 114) of each of the light-transmissive first region (64), the second region (66) and the third region (68).

* * * * *